C. HAIRGROVE.
Improvement in Harrows.

No. 122,765.    Patented Jan. 16, 1872.

Witnesses:
Chas. Nida
Geo. W. Mabee

Inventor:
Columbus Hairgrove
per Munn & Co.
Attorneys.

UNITED STATES PATENT OFFICE.

COLUMBUS HAIRGROVE, OF JACKSONVILLE, ILLINOIS.

IMPROVEMENT IN HARROWS.

Specification forming part of Letters Patent No. 122,765, dated January 16, 1872.

Specification describing a certain Improvement in Harrow, invented by COLUMBUS HAIRGROVE, of Jacksonville, in the county of Morgan and State of Illinois.

Figure 1:
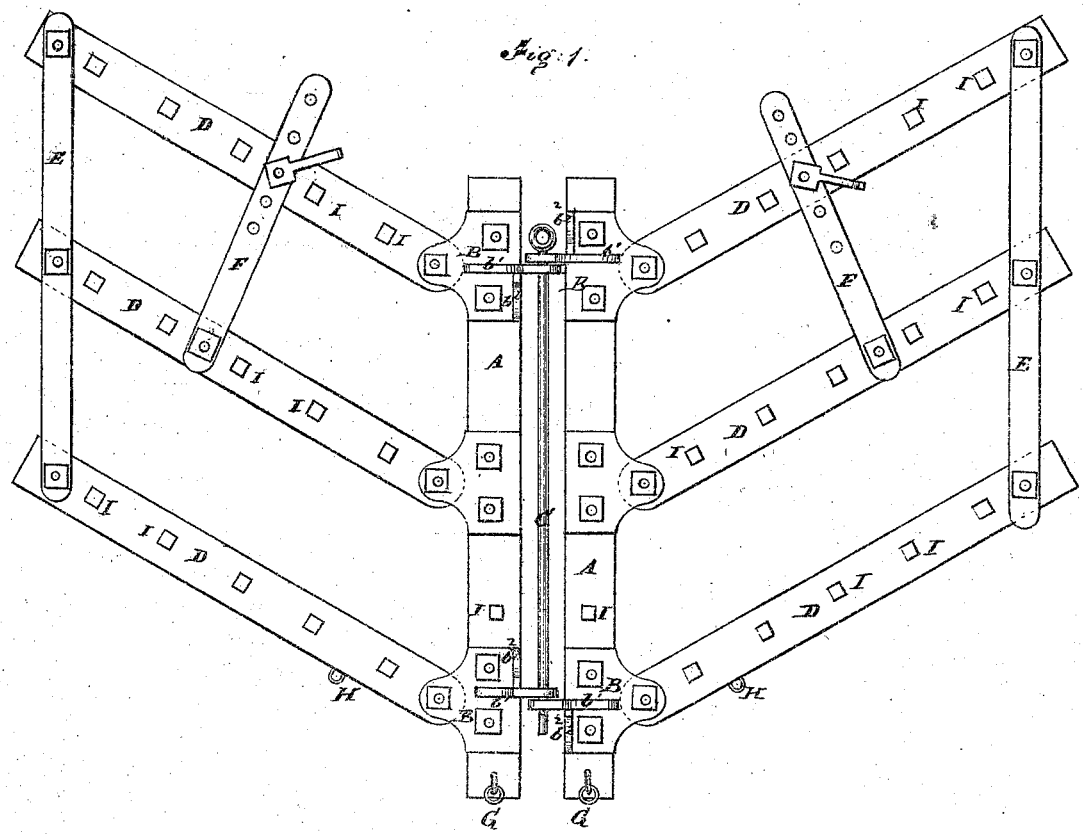
Figure 2:
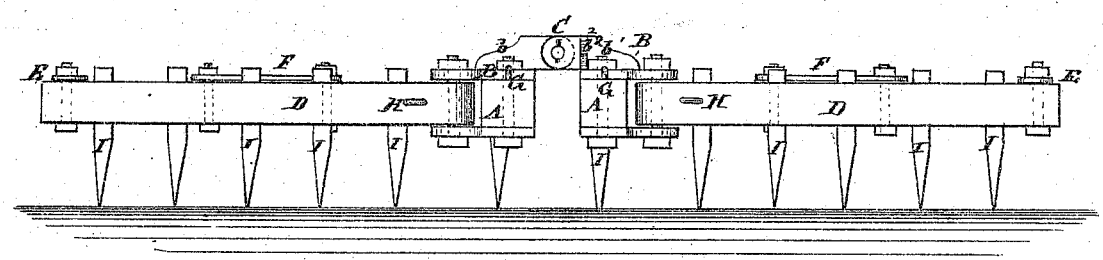

Figure 1 is a top view of my improved harrow. Fig. 2 is a front view of the same.

My invention has for its object to furnish an improved harrow which shall be simple in construction, strong, durable, not liable to get out of order, and which may be adjusted to cause the teeth to travel at any desired distance apart; and it consists in the construction and combination of various parts of the harrow, as hereinafter more fully described.

A are the central bars or beams of the harrow, to the upper side of which, near their ends, are attached plates B, which are made with upwardly-projecting flanges $b^1$, the inner ends of which project so as to overlap, as shown in Figs. 1 and 2, and have holes formed through them to receive the rod C, by which the parts of the harrow are hinged to each other. The plates B are also made with cross or brace-flanges $b^2$, by which the flanges $b^1$ are braced or strengthened. To the outer sides of the central bars A are hinged the inner ends of three, more or less, bars D by bolts passing through the ends of the said bars D and through plates attached to the upper and under sides of the said bars A, as shown in Figs. 1 and 2, the plates B serving as two of said plates. The outer ends of the bars D are connected and held in their proper relative positions by bars E, which are pivoted to the said bars D by bolts, so that the bars D may be adjusted at any desired angle with the central bars A without changing their relative positions with respect to each other. The bars D are locked in position when adjusted by the bars F, which are pivoted to one of the bars D by a bolt and are secured adjustably to one or more of the said bars by a bolt which passes through the bar or bars D and through a slot or one of a series of holes in the said lock-bars F, as shown in Fig. 1. The draft may be attached to the hooks or eyes G H. The hooks or eyes G are attached to the forward ends of the central bars A, and are more particularly designed for use when the parts of the harrow are detached and used as single or one-horse harrows. The hooks or eyes H are attached to the front hinged bars D near their hinged ends, and are more particularly designed for use when the harrow is worked square or V-shaped. I are the harrow-teeth, which are attached to the hinged bars D, and two of which are attached to the central bars A. The teeth I are so arranged, as shown in Fig. 1, that no two of them will travel in the same path, however the bars D may be adjusted. As the angle at which the hinged bars D are adjusted to the bars A decreases from a right angle, the paths in which the teeth I travel will come nearer to each other. By removing the teeth from the central bars A the harrow may be made to straddle a row of small plants and harrow both sides of said row.

Having thus described my invention, I claim as new, and desire to secure by Letters Patent—

The combination of the central bars A, flanged plates B $b^1$ $b^2$, rod C, hinged bars D, pivoted bars E, and lock-bars F with each other, substantially as herein shown and described, and for the purposes set forth.

COLUMBUS HAIRGROVE.

Witnesses:
E. K. DUNGAN,
W. H. BRONDWELL. (73)